Patented Feb. 2, 1954

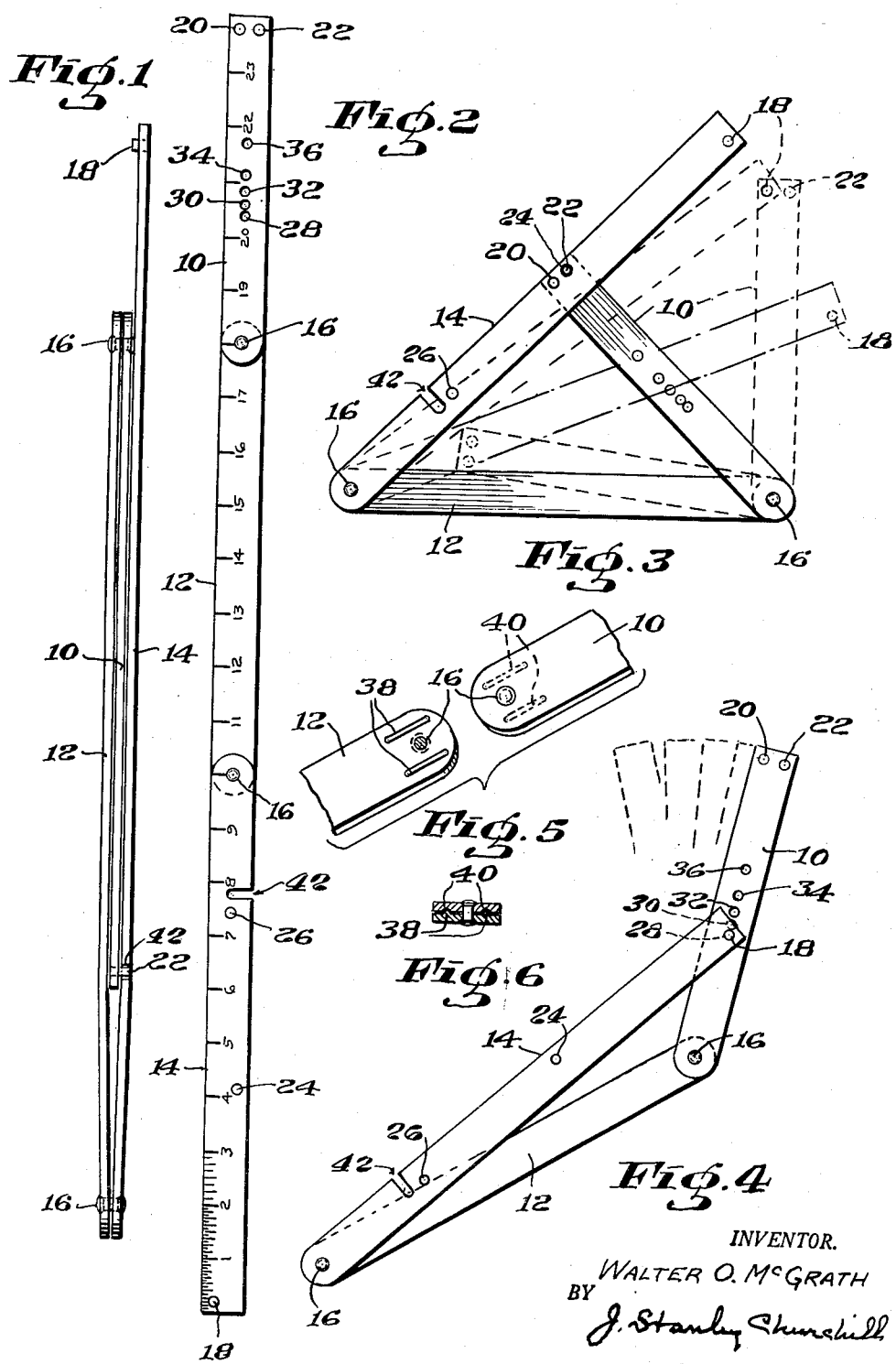

2,667,697

UNITED STATES PATENT OFFICE 2,667,697

MEASURING RULE

Walter O. McGrath, Newtonville, Mass.

Application August 8, 1952, Serial No. 303,354

1 Claim. (Cl. 33—105)

This invention relates to a measuring rule.

The invention has for an object to provide a novel and improved measuring rule which is readily adapted for measuring and marking angles of various degrees in a simple and convenient manner.

With this general object in view, and such others as may hereinafter appear, the invention consists in the measuring rule hereinafter described and particularly defined in the claim at the end of this specification.

In the drawings illustrating the preferred embodiment of the invention:

Fig. 1 is a side elevation of the present rule in its folded condition;

Fig. 2 is a front view of the rule extended for use as a measuring rule;

Fig. 3 is a view illustrating the use of the rule as a try square and as a bevel square and for laying out various angles;

Fig. 4 is a view illustrating the use of the present rule for laying out the ridge and saddle cuts of a roof rafter for various inches rise per foot run;

Fig. 5 is a perspective detail view of a hinged joint, the parts being shown separated; and Fig. 6 is a cross-sectional view of the joint.

In general, the present invention contemplates a measuring rule having hinged sections which may be used in its extended position as a measuring rule and which is adapted to be manipulated to assume positions for laying out and marking various angles when the hinged sections are moved into predetermined positions relative to each other. In the preferred embodiment of the invention, the rule is provided with three sections of a length proportional to 3, 4, and 5, the illustrated lengths of the sections being indicated as six, eight and ten inches in length, respectively, so that when the free ends of the two outer sections are joined a right-angle triangle is formed in which position the rule may be used as a try square. In other positions of adjustment of the hinged sections relative to each other the rule may form various predetermined angles for use as a bevel square. The present rule is also adapted to be adjusted to assume various angles corresponding to various degrees of inch rise per foot run for laying out and marking the ridge and plate cuts for a roof rafter. When the sections are folded together in collapsed form the rule occupies a relatively small space and may be easily carried in the pocket.

Referring now to the drawings, the illustrated measuring rule comprises three relatively flexible metallic strip sections hingedly connected together including a short section 10, an intermediate section 12, and a long section 14, the intermediate section 12 being hinged at one end to the short section 10 and at its other end to the long section 14 by pivot pins 16, as shown. Each of the three rule sections may be graduated in inches as illustrated for use as a measuring rule when the rule is extended as shown in Fig. 2.

The three rule sections are preferably of a length proportional to 3, 4, and 5 respectively, the shorter section 10 being herein shown as six inches in length; the intermediate section 12, eight inches in length; and the longer section 14, ten inches in length, so that when the hinged sections 10, 14 are connected together at their free ends a right-angled triangle will be formed, as indicated in dotted lines in Fig. 3, in which position the rule may be used as a try square or for marking the work at right angles to one edge thereof. In order to detachably connect the free ends of the sections 10 and 14 together, the outer end of the section 14 is provided with a pin 18 secured therein and extended laterally therefrom, and the outer end of the section 10 is provided with an opening 20 arranged to receive the pin 18.

When the rule is to be used as a forty-five degree bevel square, the outer end of the short section 10 may be detachably connected to a medial portion of the long section 14, and as herein shown, the connection in this position is made by a pin 22 secured to and extended laterally from the outer end of section 10 which is arranged to be received in an opening 24 formed in the section 14, such position being shown in full lines in Fig. 3. A third position of the rule, indicated in dot and dash lines in Fig. 3, is arranged to provide an angle of twenty-two and one-half degrees, the parts being detachably secured together in such position by inserting the pin 22 into an opening 26 formed in the section 14, as illustrated.

Referring now to Fig. 4, the rule is therein shown in full lines in a position for marking the ridge cut on a roof rafter having a rise of twelve inches per foot run, this angle being obtained by inserting the pin 18 of section 14 into an opening 28 formed in the section 10. In use, the inner edge of section 12 may be placed against a longitudinal edge of the rafter to be marked and the correct angle for the cut may be drawn along the outer edge of section 10. Similar markings may be made for different rises in inches per foot run by adjusting the section 14 relative to the section 10 and inserting the pin 18 into the appropriate opening, such openings being indicated on the rule according to the inch rise per foot run, the angles formed by such different positions being indicated in dotted lines in Fig. 4. As herein shown, successive openings 30, 32, 34 and 36 when connected to section 14 by pin 18 are arranged to provide angles between the sections 10 and 12 such as to mark the ridge cuts for ten, eight, six and four inches rise per foot, respectively.

Any suitable form of pivot connection may be used, the pin 16 being herein shown as a rivet headed over on both sides. As indicated in Figs. 5 and 6, one section may be provided with suitable ridges 38 arranged to fit into corresponding hollows 40 formed in an adjacent hinged section for maintaining the rule in its extended position when used as a measuring rule.

As indicated in Fig. 3, the intermediate section 12 of the rule comprises the lower section, the sections 10 and 14 being connected to the upper surface of the intermediate section so that in practice, the inner edge of section 12 may be placed flat against the edge of the work without interference from the adjacent sections. It will also be observed that the pins 18, 22 in the sections 14 and 10 respectively extend in opposite directions, that is, the pin 18 in section 14 extends to the left as viewed in Fig. 1, and the pin 22 in section 10 extends to the right. Thus, when section 10 is connected to section 14, as shown in full lines in Fig. 3, section 10 is placed under section 14, and the pin 22 is extended upwardly into the opening 24, and when the sections are connected as shown in Fig. 4, the section 14 is placed over section 10 and the pin 18 is extended downwardly into opening 28. A slot 42 is provided in section 14 to provide clearance for the pin 22 in section 10 when the rule is collapsed into its completely folded position, as shown in Fig. 1.

From the above description it will be seen that the present measuring rule is adapted to be easily and conveniently adjusted and connected for use as a try square or a bevel square and is also adapted to be adjusted for marking angle cuts on a rafter in accordance with a predetermined rise in inches per foot run in a simple and convenient manner.

While the preferred embodiment of the invention has been herein illustrated and described, it will be understood that the invention may be embodied in other forms within the scope of the following claim.

Having thus described the invention, what is claimed is:

A measuring rule of the character described comprising three rule sections including an intermediate section and two outer sections having ends hingedly connected whereby the sections may be folded relative to one another, the end of each outer section having a pin therein for insertion into one of a plurality of openings formed in each of the opposing outer sections for detachably connecting the sections to form different angles, the pins in opposing outer sections being extended in opposite directions from their respective sections, one of said sections having a slot therein to provide clearance for one of said pins when the rule is folded into its collapsed condition, said intermediate section being in one plane and both outer sections being connected to the same face of said intermediate section to dispose the outer sections in another plane whereby an edge of said intermediate section may be placed flat against a surface to be marked without interference by the ends of the adjacent outer sections, and the length of said three sections being proportioned in the ratio of three, four and five respectively, the openings in one of said outer sections being arranged for cooperation with the pin in the other outer section to form angles corresponding to predetermined rises in inches per foot run.

WALTER O. McGRATH.

References Cited in the file of this patent

UNITED STATES PATENTS

| Number | Name | Date |
|---|---|---|
| 124,222 | Scott | Mar. 5, 1872 |

FOREIGN PATENTS

| Number | Country | Date |
|---|---|---|
| 140,640 | Great Britain | Apr. 1, 1920 |
| 671,311 | France | Aug. 31, 1929 |
| 426,080 | Great Britain | Mar. 27, 1935 |